(12) United States Patent
Bosio et al.

(10) Patent No.: US 11,230,247 B2
(45) Date of Patent: Jan. 25, 2022

(54) AIRBAG INCLUDING INFLATION CHAMBER

(71) Applicant: Ford Global Technologies, LLC, Dearborn, MI (US)

(72) Inventors: Allen Charles Bosio, Basildon (GB); Brad Staines, Bishops Stortford (GB); Pieter Christopher van Ast, Cologne (DE); Gerhard Wichmann, Cologne (DE)

(73) Assignee: Ford Global Technologies, LLC, Dearborn, MI (US)

(*) Notice: Subject to any disclaimer, the term of this patent is extended or adjusted under 35 U.S.C. 154(b) by 48 days.

(21) Appl. No.: 16/711,511

(22) Filed: Dec. 12, 2019

(65) Prior Publication Data

US 2020/0189510 A1 Jun. 18, 2020

(30) Foreign Application Priority Data

Dec. 12, 2018 (GB) .................................... 1820225

(51) Int. Cl.
*B60R 21/18* (2006.01)
*B60R 21/217* (2011.01)
(Continued)

(52) U.S. Cl.
CPC .......... *B60R 21/18* (2013.01); *B60R 21/2171* (2013.01); *B60R 21/233* (2013.01); *B60R 21/261* (2013.01); *B60R 21/26005* (2013.01); *B60R 21/274* (2013.01); *B60R 22/46* (2013.01); *B60R 2021/2177* (2013.01); *B60R 2021/23107* (2013.01); *B60R 2021/23316* (2013.01); *B60R 2021/2615* (2013.01)

(58) Field of Classification Search
CPC . B60R 21/217; B60R 21/26; B60R 21/26005; B60R 21/274; B60R 2021/2177
See application file for complete search history.

(56) References Cited

U.S. PATENT DOCUMENTS 3,801,156 A * 4/1974 Granig .................... B60R 21/18
280/733
2002/0125701 A1* 9/2002 Devonport .............. B60R 21/18
280/733

(Continued)

FOREIGN PATENT DOCUMENTS

DE 3820145 A1 1/1990
DE 4305291 A1 9/1993

(Continued)

OTHER PUBLICATIONS

GB Examination Report for Application No. DE19215494.6 as issued by the European Patent Office dated Oct. 20, 2020.

(Continued)

*Primary Examiner* — Barry Gooden, Jr.
(74) *Attorney, Agent, or Firm* — Frank A. MacKenzie; Bejin Bieneman PLC (57) ABSTRACT

An assembly includes a seatbelt and an inflation chamber connected to the seatbelt. The inflation chamber is inflatable from an undeployed state to a deployed state. The inflation chamber includes a first inflation chamber and a second inflation chamber. The first inflation chamber is positioned above the second inflation chamber.

10 Claims, 4 Drawing Sheets

(51) Int. Cl.
*B60R 21/274* (2011.01)
*B60R 21/233* (2006.01)
*B60R 21/26* (2011.01)
*B60R 21/261* (2011.01)
*B60R 22/46* (2006.01)
*B60R 21/231* (2011.01)

(56) References Cited

U.S. PATENT DOCUMENTS

| | | | |
|---|---|---|---|
| 2007/0080526 A1* | 4/2007 | Itoga | B60R 21/18 280/733 |
| 2009/0160168 A1* | 6/2009 | Itoga | B60R 22/26 280/733 |
| 2009/0256337 A1* | 10/2009 | Pan | B60R 21/18 280/733 |
| 2011/0187087 A1* | 8/2011 | Kibat | B60R 21/23138 280/730.2 |
| 2012/0038137 A1* | 2/2012 | Wipasuramonton | B60R 21/18 280/733 |
| 2012/0261911 A1* | 10/2012 | Baca | B60R 21/18 280/733 |
| 2013/0264804 A1* | 10/2013 | Czach | B60R 21/18 280/733 |
| 2014/0159350 A1 | 6/2014 | Schneider et al. | |
| 2016/0059819 A1* | 3/2016 | Witt | B60R 22/12 280/733 |
| 2016/0075299 A1* | 3/2016 | Wang | B60R 21/18 280/728.2 |
| 2016/0280171 A1* | 9/2016 | Moeller | B64D 11/06205 |
| 2017/0327075 A1* | 11/2017 | Murakami | B60R 21/18 |
| 2018/0281726 A1* | 10/2018 | Murakami | B60R 21/18 |

FOREIGN PATENT DOCUMENTS

| | | |
|---|---|---|
| EP | 0963880 A1 | 12/1999 |
| EP | 1743810 A1 | 1/2007 |
| JP | 2005343316 A | 12/2005 |
| WO | 9912776 A1 | 3/1999 |

OTHER PUBLICATIONS

GB Combined Search and Examination Report for Application No. GB1820225.9 as issued by the GB Intellectual Property Office dated Jun. 3, 2019.

* cited by examiner

AIRBAG INCLUDING INFLATION CHAMBER

CROSS-REFERENCE TO RELATED APPLICATIONS

This patent application claims priority to and all advantages of UK Patent Application No. GB1820225.9 filed on Dec. 12, 2018, the foregoing application is incorporated herein by reference in its entirety.

DESCRIPTION

The present disclosure relates to an airbag and particularly, although not exclusively, to an airbag that may reduce loading on the thorax of an occupant of a vehicle following a collision.

BACKGROUND

In certain collisions, the occupants of a vehicle, e.g. a motor vehicle, may be subject to injurious forces due to deceleration of the vehicle.

SUMMARY

According to an arrangement of the disclosure there is provided an airbag including an inflation chamber inflatable from an undeployed state to a deployed state. The inflation chamber includes a first inflation chamber and a second inflation chamber; a connection for supporting the airbag on a seatbelt such that the first inflation chamber is positioned above the second inflation chamber; and a flow director for directing inflation gas into the inflation chamber to inflate the inflation chamber. The flow director is configured to direct the inflation gas into the first inflation chamber prior to the second inflation chamber.

Providing an airbag comprising a first inflation chamber that inflates prior to a second inflation chamber located below the first inflation chamber in use, means that the upper inflation chamber inflates before the lower one and therefore during a collision greater support may be provided to the upper body of an occupant. For example, positioning the seatbelt such that the airbag is located about an occupant's shoulder, specifically such that the first inflation chamber is located about an occupant's shoulder, means that, upon inflation, the inflation chamber positioned about the occupant's shoulder may inflate first and therefore the occupant's thorax may be supported.

The airbag may be supported on an underside of a seatbelt. This allows the airbag to be located between an occupant's body and the seatbelt. Accordingly the inflated airbag can act as padding. The inflated airbag may lift the seatbelt off the occupant, to further reduce the load on their shoulders and thorax. Accordingly, the airbag may be configured to offset the seatbelt from the occupant.

The airbag according to the present disclosure may therefore be said to comprise multiple inflation chambers. The airbag may therefore be termed a 'multi-chambered' airbag. The first inflation chamber may be considered to be the uppermost chamber since, in use, when the airbag is supported on a seatbelt this chamber may be positioned above the second chamber. In use, the first chamber may be positioned about an occupant's shoulder and therefore the first chamber may be the chamber proximal to the head rest of a car seat when the airbag is in use in a motor vehicle. The second chamber may therefore be positioned proximal to the floor of the car when the airbag is in use in a vehicle.

The airbag may comprise an inflator and the flow director may be a tube. The tube may extend from an inflator and terminate in the first inflation chamber to inflate the first inflation chamber prior to inflating the second inflation chamber by directing gas into the first inflation chamber prior to the second inflation chamber. The tube may extend from an inflator, into and through the second inflation chamber to the first inflation chamber where the tube may terminate. Accordingly, the flow director may be a tube comprising a non-free end attached to an inflator and a free end. In use inflation gas may pass from the inflator through the tube and out of the tube via the free end. Such a tube may be used in the airbag as described above and, accordingly, the free end of the tube may be disposed in the first inflation chamber.

The airbag may include an inflator which may be located in the inflation chamber. The airbag may include an actuator for actuating the inflator. This has the advantage that no extra wiring, etc. are required to inflate the airbag.

Alternatively the inflator may be located elsewhere on a vehicle, for example the B-pillar, the tunnel, or anywhere at or in the vehicle seat to which the seatbelt is attached.

The airbag may include an actuator for actuating the inflator, wherein the actuator is located in the inflation chamber. The airbag actuator may be a slidable connection for slidably supporting the airbag on a seatbelt. The actuator may be a roller for slidably supporting the airbag on the seatbelt.

The airbag may include an actuator unit located within the inflation chamber. The actuator unit may include an inflator for inflating the inflation chamber from an undeployed to a deployed state. The actuator unit may include an actuator for actuating the inflator. The actuator unit may include a slot for receiving an end of a seatbelt. The actuator may be configured to actuate the inflator when the seatbelt tension exceeds a predetermined level.

The actuator may be a roller configured to advance the seatbelt. The roller may be configured to displace to actuate the inflator when the seatbelt tension exceeds a predetermined level. The inflator may be a frangible tube comprising an inflation gas. The actuator may be configured to displace to break the frangible tube thereby actuating the inflator to release the inflation gas, wherein release of the inflation gas from the inflator into the inflation chamber of the airbag inflates the inflation chamber, and therefore the airbag, to its deployed state. The frangible tube may include glass. For example the frangible tube may comprise PYREX glass and/or quartz glass.

The inflator may be wrapped, or supported by, a support. The support may be a wire mesh. The support may be connected to an interior of the inflation chamber to support the inflator within the inflator chamber.

The inflation gas may include a condensed gas. For example the inflation gas may comprise approximately 20 mL of liquefied gas. The frangible tube may have an inner diameter of approximately 1 mm and an outside diameter of approximately between 1 mm and 3 mm. The material and dimensions of the frangible tube may be such that it can retain a pressurised gas (i.e., the inflation gas). The inflation gas may include Nitrous Oxide ($N_2O$). The inflation gas may be at a pressure of between 500 and 600 psi.

The inflator may be actuatable to direct inflation gas into the first inflation chamber to thereby inflate the airbag at the same time as the pretensioning of a seatbelt.

The airbag may be slidably supported on a seatbelt. This means that the airbag may be positioned within a range of different heights on the seatbelt. This, in turn, allows the occupant to adjust the airbag to a comfortable height, or a height at which the airbag will offer greater support once inflated (or deployed).

The airbag may be locatable about an occupant's shoulder and may include a locator to locate the airbag about the occupant's shoulder. The locator may be a protrusion extending from the airbag.

According to a further arrangement of the disclosure, there is provided a method of inflating an airbag, the airbag comprising an inflation chamber inflatable from an undeployed state to a deployed state, the inflation chamber including a first inflation chamber and a second inflation chamber, and a connection for supporting the airbag on a seatbelt such that the first inflation chamber is positioned above the second inflation chamber; the method including the steps of: directing inflation gas into the first inflation chamber; and then directing inflation gas into the second inflation chamber, to inflate the inflation chamber.

Prior to inflation, the method may include the step of positioning the airbag on a seatbelt such that the first inflation chamber is positioned above the second inflation chamber.

The step of directing inflation gas into the first inflation chamber may be performed at the same time as the pretensioning of a seatbelt.

Following inflation, the first and second inflation chambers may be pressurised to different pressures.

The pressure in the first inflation chamber may be higher than the pressure in the second inflation chamber.

According to a further arrangement of the disclosure there is provided a seatbelt apparatus including a seatbelt and an airbag as described above. The airbag may be supported on an underside of the seatbelt. For example the airbag may be supported on the underside of seatbelt when the seatbelt is configured for use in a motor vehicle. This means that when the airbag inflates during a collision the seatbelt is lifted off of an occupant as the inflated airbag will be located in between the seatbelt and the occupant. The thorax of the occupant may be protected immediately following a collision since the uppermost chamber of the airbag may fill with inflation gas before any other chamber of the airbag.

The airbag may be slidably supported on a seatbelt. This allows the user to slidably reposition the airbag so that it is located at a position to protect, for example, their upper body.

According to an arrangement of the disclosure there is provided an airbag with an inflator located within the airbag.

According to an arrangement of the disclosure there is provided a seatbelt apparatus comprising a seatbelt and an airbag supported on the seatbelt, wherein the airbag comprises an inflator located within the airbag.

DESCRIPTION OF THE FIGURES

For a better understanding of the present disclosure, and to illustrate how it may be put into effect, reference will now be made, by way of example only, to the accompanying drawings in which.

DETAILED DESCRIPTION

Figure 1:
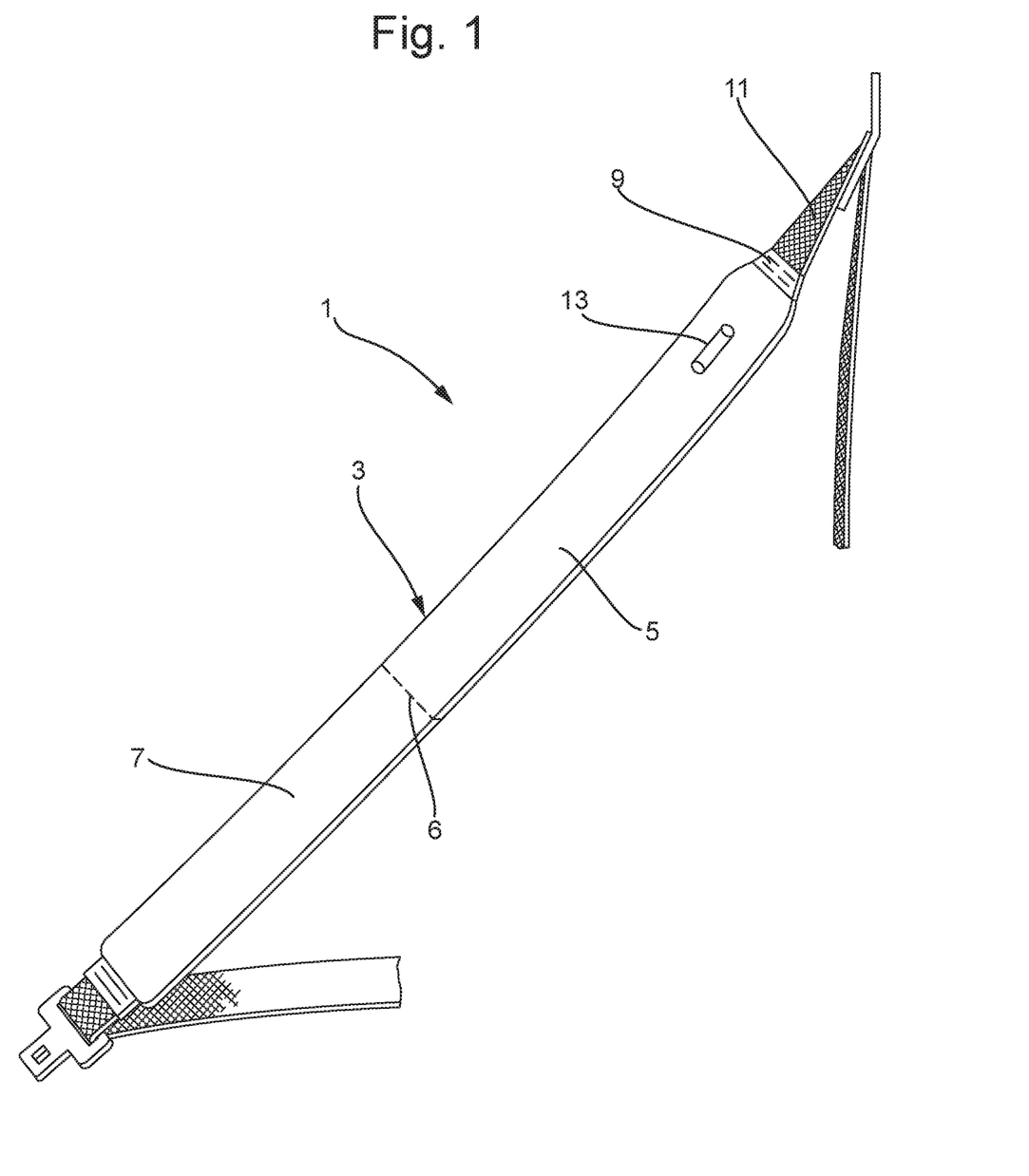
FIG. 1 is a perspective view of an airbag according to an arrangement of the present disclosure.

FIG. 1 shows an airbag 1 according to an arrangement of the present disclosure. The airbag 1 includes an inflation chamber 3. The inflation chamber 3 is inflatable from an undeployed state (shown in FIG. 1) to a deployed state. The inflation chamber 3 includes a first inflation chamber 5 and a second inflation chamber 7. A connection 9 supports the airbag 1 on a seatbelt 11 such that the first inflation chamber 5 is positioned above the second inflation chamber 7.

The airbag 1 includes a flow director 13. The flow director 13 is for directing inflation gas into the inflation chamber to inflate the inflation chamber. The flow director 13 is for directing inflation gas into the first inflation chamber 5 prior to the second inflation chamber 7.

The flow director 13 is shown in FIG. 1 to be a tube whose terminal end is located in the first inflation chamber. The tube may itself be an inflator or may direct inflation gas from an inflator to the first inflation chamber.

The connection 9 is attached to the first inflation chamber 5. When the airbag 1 is supported on the seatbelt 11 the connection 9 supports the first inflation chamber 5 at the end of the seatbelt 11 proximate to the headrest of a seat of the motor vehicle. Therefore the connection 9 supports the first inflation chamber 5 above the second inflation chamber 7. As will be appreciated this means that the first inflation chamber 5 may be located about an occupant's shoulder and the second inflation chamber 7 may be located below the occupant's shoulder (for example the occupant's lower chest) or at the occupant's shoulder but below the region of the first inflation chamber.

During a collision the airbag 1 may be actuated to inflate from an undeployed state (shown in FIG. 1) to a deployed state. During a collision the first inflation chamber 5 may be actuated to inflate from an undeployed state (shown in FIG. 1) to a deployed state. In addition, the second inflation chamber 7 may be actuated to inflate from an undeployed state (shown in FIG. 1) to a deployed state.

In order to concentrate the protection provided by the airbag 1 on the shoulder of an occupant, the first inflation chamber 5 may be configured to inflate before the second inflation chamber 7. The first inflation chamber 5 may be actuated to fully inflate before the second inflation chamber 7 begins to inflate. The first inflation chamber 5 may be actuated to begin inflating before the second chamber 7 begins to inflate. As will be described below an inflation tube (such as an inflator or a tube connected to an inflator) comprising an inflation gas for inflating at least one of the inflation chambers may be configured to terminate in the first inflation chamber 5, thereby directing gas into the first inflation chamber prior to any inflation gas being directed into the second inflation chamber 7. Inflation gas may be directed into the second inflation chamber 7 via the first inflation chamber 5.

The first and second inflation chambers 5, 7 are connected at a throat 6. The throat 6 may be any means connecting or joining the first and second inflation chambers. The throat 6 may be any passage connecting or joining the first and second inflation chambers. For example, the first and second inflation chambers 5, 7 may be sewn or otherwise attached together such that they form one substantially continuous inflation chamber. In this example, the throat 6 may comprise a gap between stitches. In another example, the throat 6 may include a frangible valve configured to break when the pressure in one inflation chamber (e.g. the first inflation chamber) is above a predetermined level. For example, the two inflation chambers may be stitched together, with no gaps between stitching, but may communicate via a frangible valve which, when broken, creates a passage between the chambers.

The throat 6 therefore may have a cross-sectional flow area substantially equal to the cross-sectional flow area of at least one of the first and second inflation chambers. Alternatively, the first and second inflation chambers may be joined at a throat 6 whose cross-sectional flow area is substantially less than the cross-sectional flow area of at least one of the first and second inflation chambers to thereby constrain airflow between the two chambers. The first and second inflation chambers 5,7 may therefore be joined at a throat 6 which is a flow constriction between the two inflation chambers. A valve may be provided at the throat 6 for regulating the flow of inflation gas therebetween.

The inflation chambers 5, 7 may be woven from a single piece or may be two individual pieces joined together.

Figure 2A:
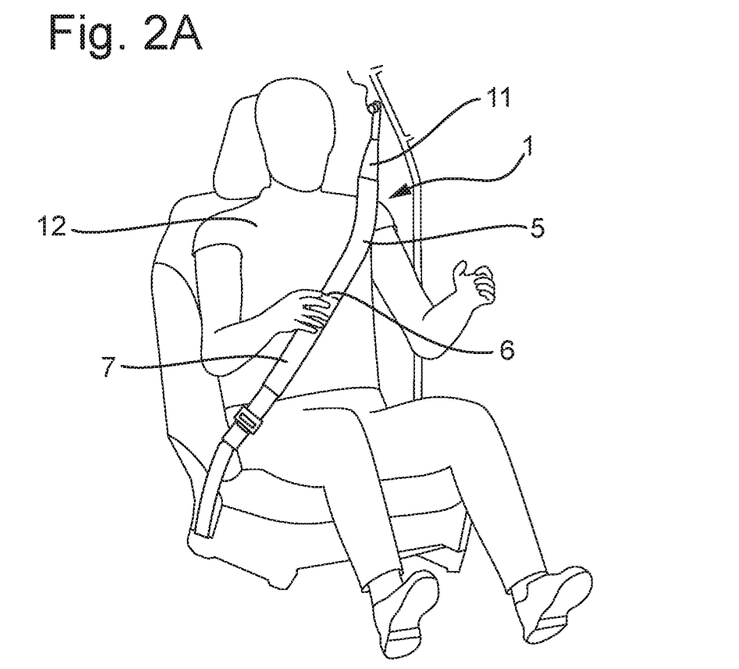
FIGS. 2A and 2B are perspective views of the airbag according to the arrangement shown in FIG. 1, supported on a seatbelt in an undeployed state (FIG. 2A) and a deployed state (FIG. 2B)
Figure 2B:
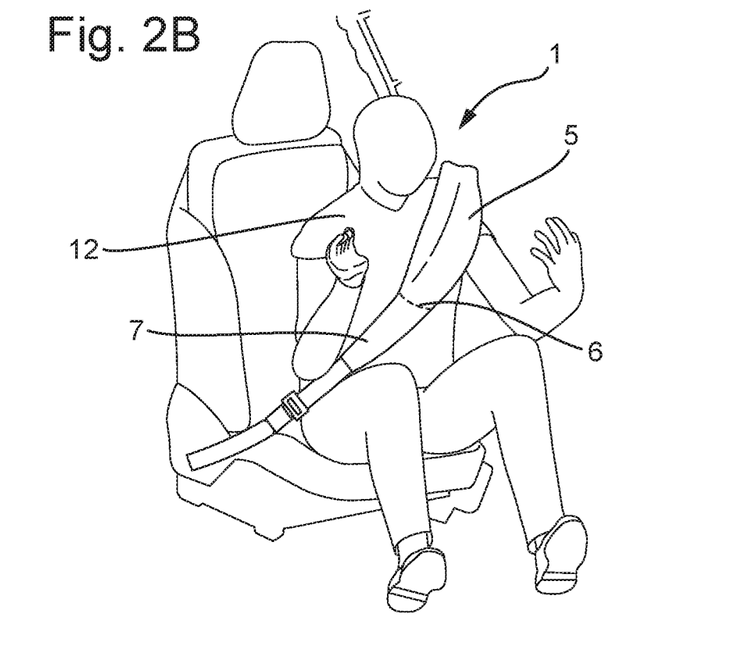

FIG. 2A shows the airbag 1 of FIG. 1 in an undeployed state. In this state an occupant 12 is either driving a vehicle or a passenger in the vehicle. The airbag 1 is supported on the seatbelt 11 and is positioned about the occupant's shoulder. Specifically, the airbag 1 is supported on the seatbelt 11 such that the first inflation chamber 5 is positioned above the second inflation chamber 7. The airbag 11 is therefore supported on the seatbelt 11 so as to locate the first inflation chamber 5 of the airbag 1 about or on the occupant's shoulder. FIG. 2B shows the airbag 1 of FIG. 1 in a deployed state. In this state the first inflation chamber 5 of the airbag 1 has been filled with an inflation gas so as to inflate to its deployed state and the second inflation chamber 7 is either being filled with inflation gas or is fully inflated. The first inflation chamber 5 has therefore been filled first, either wholly or partially, to engage the occupant's shoulder by the airbag 1 before another body part, e.g. the occupant's lower chest. FIG. 2B therefore shows that following the collision the airbag 1 has been inflated and, due to its location along the seatbelt 11, and the positioning of the first chamber above the second chamber, the inflated airbag 1 supports the occupant's upper thorax.

The forces acting on an occupant during a collision may cause the occupant to move forward in their seat (as shown in FIG. 2B). This rapid movement of the occupant may actuate the airbag to inflate from its undeployed state to its deployed state. Movement of the occupant during a collision may therefore actuate an inflator to inflate the first inflation chamber from its undeployed state to its deployed state, prior to the second inflation chamber.

Figures 3A, 3B:
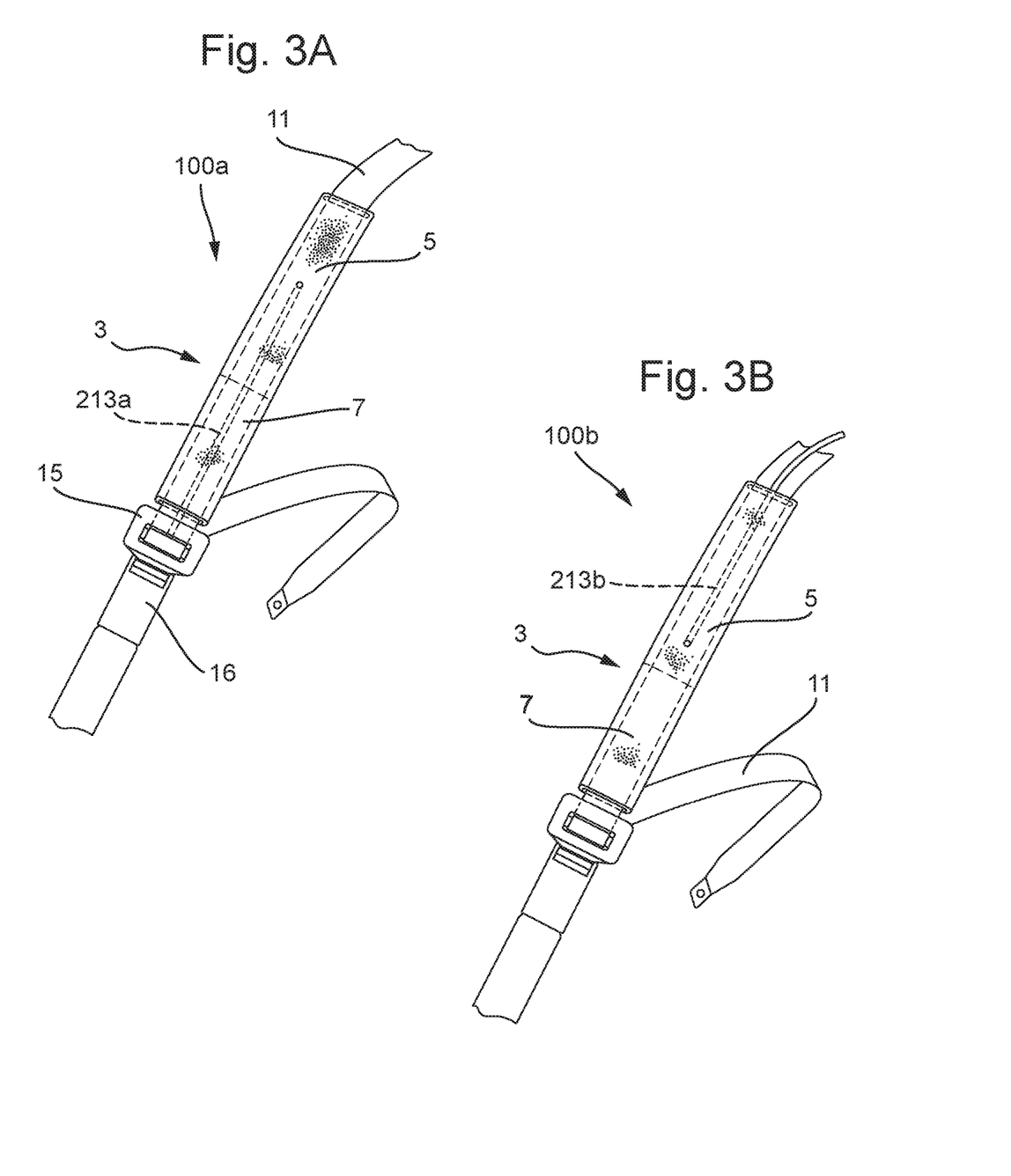
FIGS. 3A and 3B are perspective views of an airbag according to an arrangement of the present disclosure.

FIGS. 3A and 3B depict airbags 101a, 101b according to example arrangements of the present disclosure. As for the airbag of FIG. 1, the airbags 101a, 101b depicted in FIGS. 3A and 3B comprise an inflation chamber 3 including a first inflation chamber 5 and a second inflation chamber 7. Each airbag is supported on a seatbelt 11 by a connection such that the first inflation chamber 5 is positioned above the second inflation chamber 7.

FIG. 3A shows the airbag 101a including a flow director 213a for directing inflation gas into the first inflation chamber 5 prior to the second inflation chamber 7. The flow director 213a is a tube extending into the inflation chamber 3 of the airbag 101a, through the second inflation chamber 7, and into the first inflation chamber 5. Flow director 213a is a tube extending through the second inflation chamber 7 and terminating in the first inflation chamber 5. Flow director 213a may be connected at a non-free end to an inflator (not shown in FIG. 3A). The other end, the free end, of the flow director 213a is disposed and terminates in the first inflation chamber 5.

The airbag 101b of FIG. 3B therefore includes a flow director 213b for directing inflation gas into the first inflation chamber 5 prior to the second inflation chamber 7 that is a tube extending into and terminating in the first inflation chamber 5 without extending or passing through the second inflation chamber 7.

The flow director according to an arrangement of the disclosure may therefore include a tube. The tube may include a non-free end connected to an inflator and a free end configured to direct inflation gas from an inflator into the first inflation chamber of an airbag. The free end of the tube may be disposed in the first inflation chamber of an airbag or terminate in the first inflation chamber of an airbag. This configuration may ensure that inflation gas is directed immediately into the first inflation chamber before the second inflation chamber.

As the airbag may be supported on a seatbelt such that the first inflation chamber of the airbag may be positioned above the second inflation chamber of the airbag, the flow director may be configured to direct an inflation gas into the uppermost chamber of the airbag.

Accordingly the airbags of FIGS. 1, 3A and 3B may be inflated by first directing inflation gas into the first inflation chamber and then directing gas into the second inflation chamber.

An inflator may be located in a dash panel, or central console, of a vehicle, or in the B-pillar, or in the vehicle seat.

In the airbags 100a,b of FIG. 3A or 3B, part of the flow director 213a,b that extends outside of the airbag (i.e. outside of chambers 5 and 7) may be surrounded by a sleeve. The sleeve may be part of the seatbelt 11. The sleeve may be supported on a seatbelt 11 in the areas not surrounded by the airbags 100a,b. The sleeve may house the flow director 213a,b. Accordingly, a sleeve may be supported on the seatbelt 11 proximate the headrest of a vehicle seat and may be configured to receive the flow director 213a,b. Alternatively the sleeve may be supported on the seatbelt 11 proximate the seatbelt buckle. In this way, any parts of the flow director 213a,b that extend outside of the airbag (e.g. part of the flow director extending out of an upper end, or below a lower end, of the airbag) may be housed by a sleeve and therefore may not be visible in use. For example, the flow director 213a, 213b may not be visible extending out of the airbag and along the seatbelt 11.

Figure 4A:
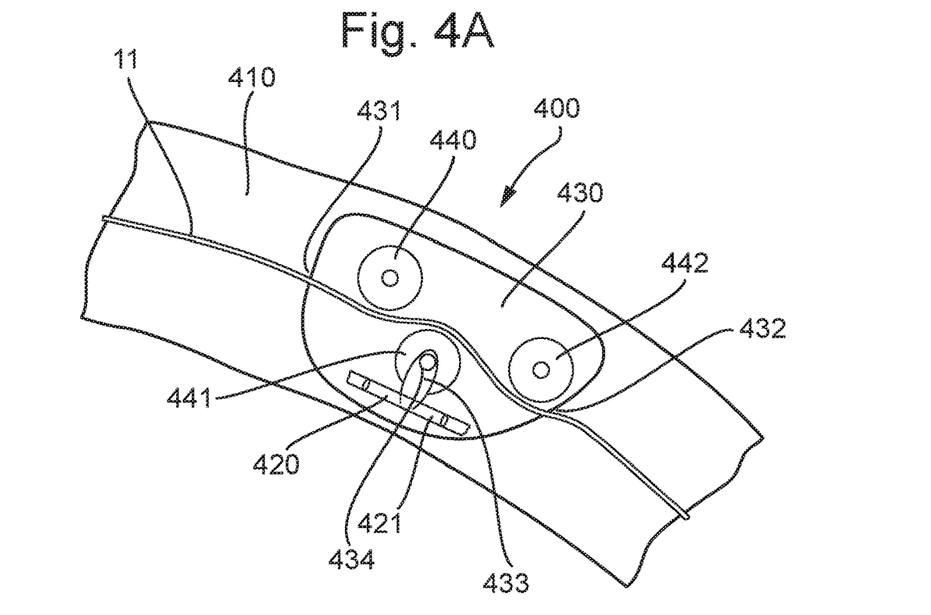
FIGS. 4A and 4B are side cutaway views of an airbag according to an arrangement of the present disclosure.
Figure 4B:
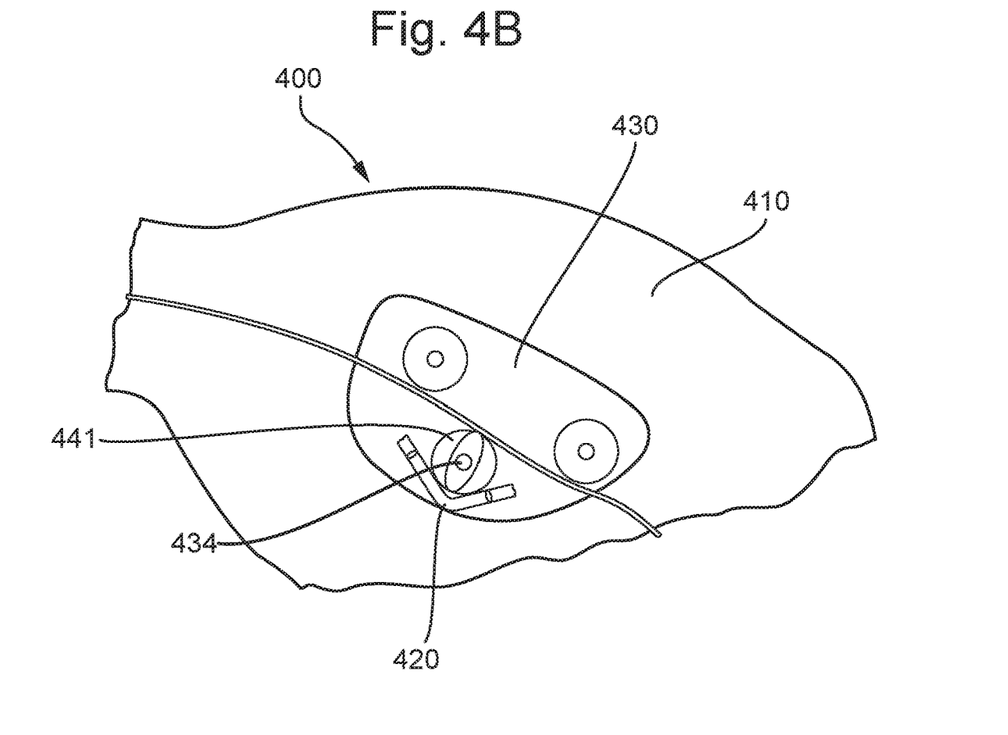

FIGS. 4A and 4B show an example airbag 400 according to an arrangement of the present disclosure. The airbag includes a connection for supporting the airbag 400 on a seatbelt 11. The connection is at least partially provided by a guide, such as a first roller 441. Movement of the airbag 400 may therefore include movement of the first roller 441 along—permitting relative movement therebetween and relative to the seatbelt 11. The first roller 441 may therefore slidably support the airbag 400 on the seatbelt 11.

The airbag 400 includes a first inflation chamber 410 shown in FIG. 4A in an undeployed state. The connection 441 supports the airbag 400 on the seatbelt 11 such that the first inflation chamber 410 is positioned above a (not shown) second inflation chamber of the airbag 400. The inflation chamber 410 includes an inflator 420 and an actuator unit 430 for actuating the inflator 420. The actuator unit 430 includes slots 431, 432 for receipt of the seatbelt 11. Each slot 431, 432 is configured to receive an end of the seatbelt 11 such that the seatbelt 11 extends through the actuator unit 430. The airbag 400 may therefore be supported on the seatbelt 11 by the actuator unit 430 and the actuator unit 430 may be regarded as a slidable connection for slidably supporting the airbag 400 on the seatbelt 11.

The actuator unit 430 includes additional guides, for example a second guide and a third guide, such as a second roller 440 and a third roller 442. First, second, and third rollers 440, 441, and 442 are each configured to allow the seatbelt 11 to move along and past the rollers. The seatbelt 11 extends through the actuator unit 430 and through the first, second and third rollers. It will be appreciated that the rollers facilitate ease of movement of the seatbelt 11 through the actuator, and therefore through the airbag 400.

FIG. 4A depicts the seatbelt 11 in normal vehicle use, i.e. not during or immediately following a collision. In such use, the seatbelt 11 is slack so that an occupant may pull to adjust the seatbelt 11. When the occupant pulls or pushes the seatbelt 11 the seatbelt 11 will advance through the first inflation chamber 410 of the airbag 400 through the rollers 440, 441, 442. Such normal use is distinguished from the seatbelt being pretensioned, e.g., following a collision, which will be described with reference to FIG. 4B.

The inflator 420 is a frangible tube including an inflation gas 421. The inflation gas 421 is contained within the frangible tube 420 which is configured to break upon application of a predetermined force. Breaking of the frangible tube 420 will release the inflation gas 421 into the first inflation chamber 410 of the airbag 400. The release of inflation gas 421 into the first inflation chamber 410 will cause the first inflation chamber 410 to inflate to its deployed state (shown in FIG. 4B) and therefore cause the airbag 400 to inflate.

A slot 433 may be provided to guide the first roller 441 into abutment with the frangible tube when the seatbelt tension is above a predetermined level.

The first roller 441 is an actuator displaceable to break the frangible tube 420 to thereby release the inflation gas 421 to inflate the airbag 400. The first roller 441 may be configured to displace when the tension in the seatbelt 5 exceeds a predetermined level. In this way, in the event of a collision, the automatic pretensioning of the seatbelt 11 and/or the movement of the occupant will increase the tension in the seatbelt 11. The predetermined level may be set at below this belt tension (following pretensioning). The at least one guide (e.g. at least one of the first, second and third rollers) define a curved (i.e. non-straight) path for the seatbelt. For example, the first guide may intersect a path tangential to both the second and third guides (or a path extending therebetween). As tension in the seatbelt increases, a force may act on the first guide to force the first guide into the path defined by the second and third guides (or a path extending therebetween). In this way, this force may force the first guide into a straight line intersecting all three guides. As tension in the seatbelt increases, therefore, a force may act on the first guide to straighten the seatbelt between the second and third guides. Movement of the first guide (e.g. first roller 441) may actuate the inflator.

The actuator unit 430 may therefore be configured to actuate the inflator 420 to inflate the airbag 400 when the tension in the seatbelt exceeds a predetermined level. The actuator unit 430 may therefore be regarded as an actuator for the inflator.

The slot 433 is a slot for the first roller 441. A pin 434 is provided within the slot, the pin being connected to the first roller 441 to enable movement of the first roller 441 within the slot. The first roller 441 may be held in place by the inflator. Alternatively, the first roller 441 may be held in place by a spring whose bias restricts the first roller's motion toward the frangible tube 420. Therefore, the force required to break the frangible tube and inflate the airbag may be the force required to overcome the spring bias so that the first roller 441 may advance toward the frangible tube 420.

FIG. 4B shows the seatbelt 11 following pretensioning, for example following pretensioning caused by a collision. The seatbelt 11 is shown at a tension above the predetermined level required to actuate the actuator unit 430. As shown in FIG. 4B the seatbelt 11 tension has urged the first roller 441 to apply a force to the frangible tube 420 above the predetermined force to break the tube 420. Accordingly the first roller 441 has displaced to break the frangible tube 420. Inflation gas 421 has advanced into the first inflation chamber 410 which has caused the first inflation chamber 410 to inflate to its deployed state. As such, FIG. 4B shows the airbag 400 in its deployed state. The example in FIGS. 4A and 4B shows an airbag according to the present disclosure wherein the inflator is located within the airbag. In other examples, the inflator may be located on or outside of the airbag.

Although three rollers are depicted in the actuator unit 430 it will be appreciated that any number of rollers is within the scope of the disclosure.

Accordingly, any of the airbags described above may be inflated to an undeployed state to a deployed state by first directing inflation gas into a first inflation chamber of the airbag, and then directing gas into a second inflation chamber of the airbag, the second inflation chamber being positioned below the first inflation chamber when the airbag is supported on a seatbelt.

A valve may be provided between the first and second inflation chambers to ensure that the two chambers are pressurized at different pressures following inflation. The first inflation chamber may be kept at a higher pressure than the second inflation chamber following inflation. For example, the valve may ensure that gas is bled into the second inflation chamber from the first inflation chamber.

Although an airbag including two chambers has been described and depicted it will be readily appreciated that any number of chambers may be utilised according to the principles of the present disclosure. For example, a plurality of chambers may be used and in use the airbag may be supported on a seatbelt such that the chamber proximate a headrest of a car seat is inflated first, prior to any other chambers. In this way the airbag may inflate to support an occupant's thorax during a collision.

The invention claimed is:

1. An assembly comprising:
  a seatbelt;
  an inflation chamber connected to the seatbelt and inflatable from an undeployed state to a deployed state, the inflation chamber including a first inflation chamber and a second inflation chamber, the first inflation chamber being positioned above the second inflation chamber;
  an inflator containing an inflation gas, the inflator being located in the inflation chamber;
  the inflator being a frangible tube; and
  an actuator displaceable to break the frangible tube.

2. The assembly of claim 1, wherein the actuator is in the inflation chamber.

3. The assembly of claim 1, wherein the inflation gas is a compressed gas in the frangible tube.

4. The assembly of claim 1, wherein the inflator is actuatable to direct the inflation gas into the first inflation chamber and inflate the airbag at the same time as the pretensioning of the seatbelt.

5. The assembly of claim 1, wherein the first and the second inflation chambers are connected at a throat.

6. The assembly of claim 1, wherein, the airbag is supported on an underside of the seatbelt.

7. The assembly of claim 1, wherein the actuator includes a roller engaged with the seatbelt, the roller being configured to be displaced by the seatbelt when tension in the seatbelt exceeds a predetermined level.

8. The assembly of claim 7, wherein the roller slideably supports the airbag on the seatbelt.

9. The assembly of claim 7, wherein the actuator includes a second roller engaged with the seatbelt, the seatbelt being between the roller and the second roller.

10. The assembly of claim 7, wherein the actuator includes a slot receiving the roller.

* * * * *